United States Patent [19]

Lan et al.

[11] Patent Number: 5,514,408
[45] Date of Patent: May 7, 1996

[54] NON-HEATING FOOD BINDER

[75] Inventors: Li-Ling Lan, Taipei Hsien; Wan-Hsiang Tsai, Chia-I Hsien, both of Taiwan

[73] Assignee: Kowng Young Pharm. & Chem Co., Ltd., Taipei Hsien, Taiwan

[21] Appl. No.: 337,390

[22] Filed: Nov. 8, 1994

[51] Int. Cl.$^6$ .................................................. A23J 1/00
[52] U.S. Cl. ................................................ 426/656; 426/657
[58] Field of Search ........................... 426/656, 454, 426/623, 630, 658, 807, 635, 69, 74, 72, 56, 57

[56] References Cited

U.S. PATENT DOCUMENTS

| | | | |
|---|---|---|---|
| 4,055,681 | 10/1977 | Balaz et al. | 426/805 |
| 4,474,694 | 10/1984 | Coco et al. | 426/656 |

Primary Examiner—Anthony J. Weier
Attorney, Agent, or Firm—Bacon & Thomas

[57] ABSTRACT

A non-heating type food binder which contains one or more natural proteins containing an amine acid unit with an —OH group or an —NH2 group and one or more powdery products selected from the group consisting of a hydroxide of an alkaline earth metal, an oxide of an alkaline earth metal, powdery calcined or burned eggshell, powdery calcined or burned shell, powdery calcined or burned bones and the mixtures thereof. The binding is achieved through the formation of bonds forming bridge linkage between a bivalent ion with the groups of the protein amino acid units of the protein of the binder and of the food. The food binder provides good binding properties without introducing undesirable taste or flavor and is easy to use.

11 Claims, No Drawings

NON-HEATING FOOD BINDER

BACKGROUND OF THE INVENTION (a) Field of the Invention

The present invention relates to a non-heating type food binder and more particularly to the one capable of binding, without the aid of heating, raw foods such as meat, fish, shellfish, or vegetables or the combinations thereof after processing. Foods after such treatment of binding won't be disintegrated upon refrigeration or thawing, so that the binding of foods can be accomplished.

(b) Description of the Prior Arts

Two conventional prior arts in binding foods are described as follows:

A. The binding of foods is accomplished by applying a salt such as sodium chloride or a phosphate to the foods to be treated; leaving the salted food to stand for a long period of time so that the salt solution-soluble proteins are dissolved out of the foods; treating by a physical method, for example, mixing at a high speed or putting meat or foods in a container and spinning the container with the meat or foods enclosed therein after reducing the pressure in the container to vacuum; and thereafter applying a heat treament, whereby the proteins coming out of the foods are denatured and exhibit binding properties. Products obtained from such process is represented by ham, Chinese sausage, fishball and meatball, etc.

B. Emulsification process: filling or stuffing foods such as meat, fish, shellfish or fat or the combinations thereof into a casing or a tube of thin skin after the emulsification of sodium caseinate with high speed mixing, followed by a heat treatment to have the proteins of foods denatured and render the proteins binding. Products obtained from this proces is represented by hot dog and Frankfurt sausage etc.

However, the binding processes as mentioned above have the following drawbacks from the standpoint of practical use:

(1) The binding can be achieved by heating the foods so that the proteins of the foods denature to provide binding properties. However, the aforementioned two prior arts are not applicable to the treatment of raw foods including raw meat, fish, shellfish and vegetables before cooking.

(2) The taste or the flavor of foods been treated by either one of the aforementioned two proceses is tend to be affected or rendered peculiar due to the heating procedure.

SUMMARY OF THE INVENTION

Therefore the main object of the present invention is to provide a non-heating type food binder that is easy to handle and can make foods binded together without the procedure of heating.

A further object of the present invention is to provide a non-heating type food binder, with which foods are binded will not disintegrated after refrigeration or thawing.

A still further object of the present invention is to provide a non-heating type food binder which will have no effect on the taste or flavor of the foods to be binded. The objects mentioned above can be accomplished by the use of a non-heating type food binder which comprises one or more proteins soluble or dispersable in a neutral or alkaline aqueous solution and one or more powdery products selected from the group consisting of a hydroxide of an alkaline earth metal, an oxide of an alkaline earth metal, powdery calcined or burned eggshell, powdery calcined or burned shell, powdery calcined or burned bones and the mixtures thereof. Applying and distributing the binder on the surface of the foods to be binded together or mixing the binder with the foods to be binded together will give a binded product within a short period of time. This invention, as well as the mechanism through which the binding is accomplished and the advantages thereof can be further understood by the following detailed description.

DETAILED DESCRIPTION OF THE INVENTION

The mechanism of binding foods which is achieved by the use of the binder according to the present invention can be illustrated, with cysteine as example, as below.

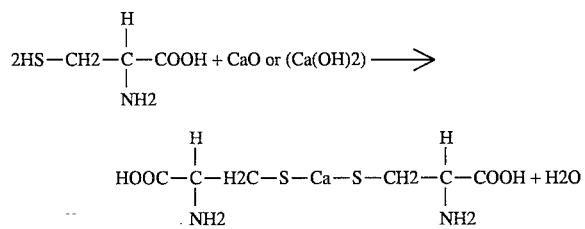

The binding of a protein having a cysteine unit and calcium oxide or calcium hydroxide is obtained by the formation of bonds between calcium and sulfur atoms. The following further illustrates the mechanism of binding in the foods.

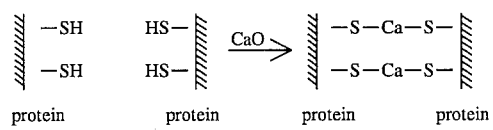

It can be understood from the above illustration that the binding of foods is accomplished through bond formation between Ca++ and —SH of the cysteine.

Moreover, applying and distributing the binding mixture containing one or more proteins soluble or dispersable in a neutral or alkaline aqueous solution and one or more powdery products selected from the group consisting of a hydroxide of an alkaline earth metal, an oxide of an alkaline earth metal, calcined or burned eggshell, calcined or burned shell and calcined or burned bones on the surface of the foods or mixing to be treated or mixing the binding mixture with the foods to be treated will make the foods binded together within a short period of time and shaped. The proteins present in the f cods and in the non-heating type food binder of this invention includes the ones containing an amine acid unit with an —SH group (such as cysteine), an amine acid unit with an —NH2 group (such as lysine) or an amine acid unit with an —OH group. Proteins having an amine acid with an —NH group will work also in the binding but not as well as those having the above mentioned groups. The hydroxide of an alkaline earth metal is preferrably Ca(OH)2 and the oxide of an alkaline earth metal is preferrably CaO. The hydroxides or oxides of beryllium and magnesium are seldom used for having a bitter taste.

The powder of calcined or burned egg-shell, shell or bone contain calcium.

Here are the reactions of the calcium containing products with amino acids:

(1) an amino acid with an —SH group, such as cysteine

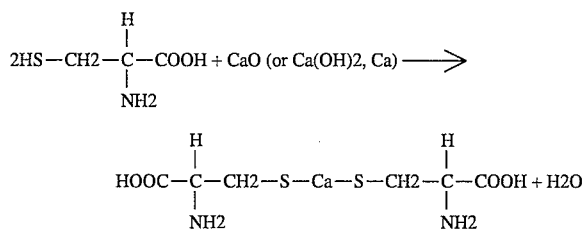

(2) an amino acid with an —NH2 group, such as lysine

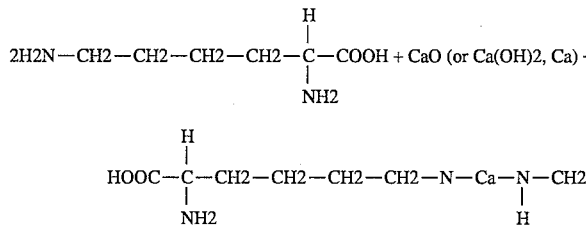

(3) an amino acid with an —OH group, such as serine

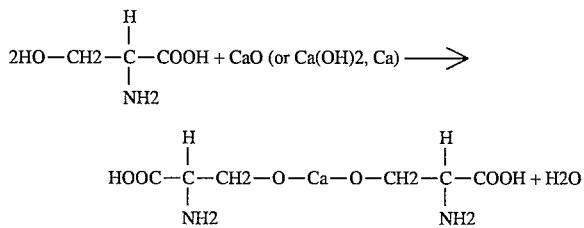

The binding of a food with another one using the food binder of the invention is illustrated as follows:

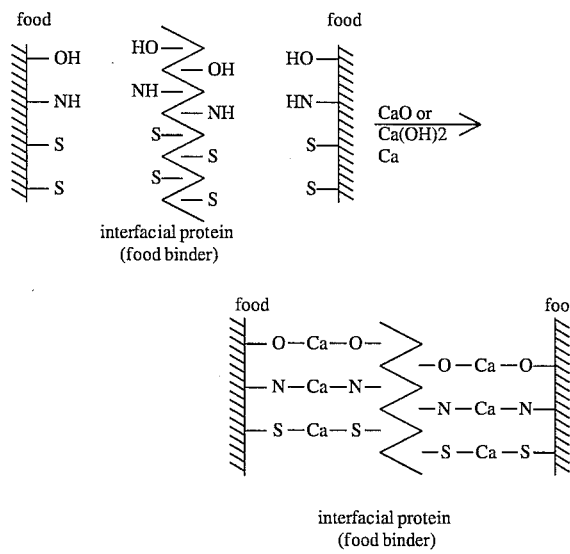

The materials that can be used as components of the binder of the present invention are naturally available or anything edible. The binder has no effect on the taste or flavour of the food and will not introduce undesirable tastes or flavour after binding.

Proteins that can be used in the binder of this invention include ovalbumin and proteins of soybean, wheat, whey and plasma as well as sodium caseinate. The hydroxides and oxides of alkaline-earth metals include calcium hydroxide and calcium oxide. Said powery product of calcined or burned eggshell, shell and bones are obtained from the calcination or burning of the materials such as oyster shell, clam shell and any other kinds of shell and animal bones such as those from cows and pigs at a temperature above 800° C., following by grinding into powder.

When albumin is used the mixture containing compounds of alkaline earth metals and powdery product of calcined or burned eggshell, shell and bones employed is in the amount of from 2 to 100 parts by weight per 100 parts by weight of the albumin. The binding is not satisfactory and interstices will take place between the foods binded together when the amount of the latter is lower than 2 parts. On the other hand, a good binding can be achieved when the amount of the latter is higher than 100 parts; however, a bitter or undesirable taste or flavour will be introduced.

The production cost of the food binder of the present invention can be reduced by the addition of a thickener as diluent such as starch, seaweed extract, agar, carrageen gel and sodium alginate. The amount of this thickener should not exceed 40% by weight of the binder.

The non-heating type food binder according to the present application can be used by uniformly applying the binder on or mixing the binder with meat, sea food and vegetable and refrigeration. The binding effect of the binder is excellent. No disintegration in the food thus treated is found, even after heating or cooking.

EXAMPLE 1

A food binder obtained from mixing four components including 30 g powdery whey protein, 40 g powdery ovalbumin, 10 g calcined or burned shell powder and 20 g flour is uniformly applied on the surfaces of meat slices and cubes. The meat slices and cubes were put together and left to stand for 25 minutes; thereafter, they are refrigerated. No disintegration or undesirable taste or flavour was found after thawing, even after cooking.

EXAMPLE 2

A food binder obtained from mixing four components including 40 g powdery whey protein, 20 g calcined or burned eggshell powder, 10 g seaweed extract and 30 g potato starch was uniformly applied on cuttlefish pieces. Two pieces of the cuttlefish were put together and left to stand for one hour at room temperature followed by being frozen for more than 24 hours. No disintegration was found after the cuttlefish pieces thawed. The binding between the two pieces of cuttlefish was still very good after they were boiled. EXAMPLE 3

A food binder obtained from mixing 5 g soybean protein powder, 5 g barley protein powder, 60 g ovalbumin powder, 15 g calcium hydroxide and 15 g corn starch was uniformly applied on the surfaces of asparagus shoots. Separately, a same binder was also uniformly applied on the surfaces of a piece of bacon. Then the bacon applied with the binder was rolled up with the asparagus shoots enclosed therein. The rolled-up product of the bacon and asparagus shoots was left to stand for 30 minutes at room temperature. No disintegration was found after cooling or deep-frying the food immediately thereafter.

EXAMPLE 4

A food binder was obtained by mixing 5 components including 20 g powdery whey protein, 20 g sodium caseinate, 15 g calcined or burned shell powder, 15 g salt and 30 g potato starch. The binder in the amount of from 2 to 4 g was then dissolved in 12 ml water with stirring. The solution thus obtained was mixed with 100 g of meat or cuttlefish and filled into a casing or tube of thin skin. The resulted mixture was left to stand for one hour at 10° C. and was then frozen. No disintegration was found after the meat or cuttlefish thawed. The meat or cuttlefish applied with the food binder exhibited good binding after being boiled in water.

EXAMPLE 5

A food binder was obtained by mixing 6 components including 30 g whey protein, 20 g sodium caseinate, 10 g calcined or burned shell powder, 10 g salt, 20 g maltodextrin and log plasma protein. The binder in the amount of from 2 to 3 g was then dissolved in from 6 to 9 ml of water with stirring. The solution thus obtained was mixed with 100 g beef and filled into a casing or tube of thin skin. After standing for one hour at 10° C. and being frozen, the beef showed no disintegration either when sliced upon thawing or when is boiled in water.

EXAMPLE 6

A food binder was obtained by mixing 5 components including 25 g whey protein, 20 g sodium caseinate, 15 g calcined or burned shell powder, log salt and 30 g potato starch. The inner surface of a piece of duck skin was uniformly applied with such binder and thereafter one or more pieces of duck meat was spread thereon. Following a further uniform application of the food binder on the surface of the duck meat, vegetables such as carrot or string bean are spread thereon. The duck skin with vegetables enclosed therein was rolled up and tied. The product thus obtained was left to stand for one hour at 10° C. and was then frozen. No disintegration was found after thawing or the following baking process.

We claim:

1. A food binder composition for binding food without heating, which comprises at least one protein which is soluble or dispersible in a neutral or alkaline aqueous solution, and which is selected from the group consisting of ovalbumin, wheat, whey, sodium caseinate, plasma protein and mixtures thereof; and at least one powdery product selected from the group consisting of a hydroxide of an alkaline earth metal, an oxide of an alkaline earth metal, calcined eggshell, burned eggshell, calcined shell of a land or sea animal, burned shell of a land or sea animal, calcined bone, burned bone, and mixtures thereof; said composition capable of binding food without heating and containing from 2 to 100 parts of said powdery product per 100 parts of said protein.

2. A composition as claimed in claim 1 wherein the binder further comprises 0–40% by weight of starch, seaweed extract, agar, carrageenan gel, sodium alginate, or a mixture thereof.

3. A composition as claimed in claim 1 wherein the hydroxide of an alkaline earth metal is calcium hydroxide and the oxide of an alkaline earth metal is calcium oxide.

4. A composition as claimed in claim 1 which comprises powdery whey protein, powdery ovalbumin, calcined or burned shell powder, and wheat flour.

5. A composition as claimed in claim 1 which comprises powdery whey protein, calcined or burned eggshell powder, seaweed extract, and potato starch.

6. A composition as claimed in claim 1 which comprises soybean protein powder, barley protein powder, ovalbumin powder, calcium hydroxide and cornstarch.

7. A composition as claimed in claim 1 which comprises powdery whey protein, sodium caseinate, calcined or burned shell powder, salt and potato starch.

8. A composition as claimed in claim 1 which comprises whey protein, sodium caseinate, calcined or burned shell powder, sodium chloride, maltodextrin and plasma protein.

9. A composition as claimed in claim 1 which comprises by weight of the binder composition about 25% by weight whey protein, about 20% by weight sodium caseinate, about 15% by weight calcined or burned shell powder, about 10% by weight sodium chloride, and about 30% by weight potato starch.

10. A method of processing raw food products in the absence of heating which comprises mixing the binder composition of claim 1 with raw meat, raw fish, raw shellfish, or a combination thereof, and forming the mixture into a shaped, bound product.

11. A processed raw food product which is prepared in the absence of heating by mixing raw meat, raw fish, raw shellfish, raw vegetables, or a combination thereof with a food binder composition as claimed in claim 1 in an amount sufficient to bind food without heat, and forming the mixture into a shaped, bound product.

* * * * *